United States Patent
Chien et al.

(10) Patent No.: US 12,506,366 B2
(45) Date of Patent: Dec. 23, 2025

(54) WIRELESS TRANSMISSION MODULE

(71) Applicant: TDK TAIWAN CORP., Taoyuan (TW)

(72) Inventors: Feng-Lung Chien, Taoyuan (TW); Chien-Hung Lin, Taoyuan (TW); Ni-Ni Lai, Taoyuan (TW); Hsiang-Hui Hsu, Taoyuan (TW); Mao-Chun Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 736 days.

(21) Appl. No.: 17/880,032

(22) Filed: Aug. 3, 2022

(65) Prior Publication Data

US 2023/0412006 A1     Dec. 21, 2023

(30) Foreign Application Priority Data

Jun. 14, 2022   (CN) .......................... 202210671653.7

(51) Int. Cl.
| | |
|---|---|
| *H01F 5/06* | (2006.01) |
| *H01F 1/147* | (2006.01) |
| *H02J 50/00* | (2016.01) |
| *H02J 50/12* | (2016.01) |

(Continued)

(52) U.S. Cl.
CPC ........ *H02J 50/402* (2020.01); *H01F 1/14766* (2013.01); *H01F 5/06* (2013.01); *H02J 50/005* (2020.01); *H02J 50/12* (2016.02); *H01F 38/14* (2013.01)

(58) Field of Classification Search
CPC ........ H02J 50/402; H02J 50/005; H02J 50/12; H02J 50/10; H01F 1/14766; H01F 38/14; H01F 27/366
See application file for complete search history.

(56) References Cited

U.S. PATENT DOCUMENTS

| | | | |
|---|---|---|---|
| 2012/0139356 A1* | 6/2012 | Jung ....................... | H02J 50/90 |
| | | | 307/104 |
| 2014/0168019 A1 | 6/2014 | Hirobe et al. | |
| 2017/0222481 A1* | 8/2017 | Jeong ..................... | H02J 50/12 |

(Continued)

FOREIGN PATENT DOCUMENTS

| | | | | |
|---|---|---|---|---|
| CN | 102906828 A | * | 1/2013 | ......... H01F 17/0006 |
| CN | 113990651 A | | 1/2022 | |

(Continued)

OTHER PUBLICATIONS

Search Report mailed Aug. 10, 2023 issued in corresponding European Application No. 22191242.1, 9 pages.

*Primary Examiner* — Tuyen T Nguyen
(74) *Attorney, Agent, or Firm* — MUNCY, GEISSLER, OLDS & LOWE, P.C.

(57) ABSTRACT

A wireless transmission module corresponds to an electronic module and is configured to transmit a first signal. The wireless transmission module includes a corresponding surface, a base assembly, and a first coil. The corresponding surface faces the electronic module and is perpendicular to a main axis. The first coil is disposed on the base assembly. The first coil overlaps at least a portion of the base assembly when viewed along the main axis. The first coil overlaps at least a portion of the base assembly when viewed in a direction that is perpendicular to the main axis.

19 Claims, 10 Drawing Sheets

(51) Int. Cl.
*H02J 50/40* (2016.01)
*H01F 38/14* (2006.01)

(56) References Cited

U.S. PATENT DOCUMENTS

2019/0074724 A1\* 3/2019 Wittenberg ........... H01F 27/288
2019/0165474 A1   5/2019 An et al.
2020/0090858 A1   3/2020 Hong et al.

FOREIGN PATENT DOCUMENTS

EP          1998342 A2 \* 12/2008  ........... H01F 27/027
JP          2012038836 A  \*  2/2012

\* cited by examiner

WIRELESS TRANSMISSION MODULE

CROSS REFERENCE TO RELATED APPLICATIONS

This application claims the benefit of China Patent Application No. 202210671653.7, filed on Jun. 14, 2022, the entirety of which is incorporated by reference herein.

BACKGROUND OF THE DISCLOSURE

Field of the Disclosure

The present disclosure relates to a wireless transmission module, and more particularly to a wireless transmission module applied to wireless communication or wireless charging.

Description of the Related Art

As technology has progressed, many kinds of electronic devices such as tablet computers and smartphones have begun to include the functionality of wireless charging. A user can place the electronic device on a wireless charging transmitting terminal so that the wireless charging receiving terminal inside the electronic device generates current via electromagnetic induction or electromagnetic resonance to charge the battery. Due to the convenience of wireless charging, electronic devices equipped with wireless charging modules have gradually become popular.

In general, wireless charging modules include a magnetically conductive substrate to support a coil. When the coil is provided with electricity to operate in a wireless charging mode or a wireless communication mode, the magnetically conductive substrate can concentrate the magnetic lines of force emitted from the coil for better performance. However, the existing structure of the wireless charging (or communication) module and the existing way of winding the coil do not meet the various requirements for wireless transmission modules, such as better charging performance, better communication performance, and less thickness.

Therefore, how to design a wireless transmission module capable of fulfilling the user's various needs is a topic nowadays that needs to be discussed and solved.

BRIEF SUMMARY OF THE DISCLOSURE

According to some embodiments of the disclosure, the present disclosure provides a wireless transmission module corresponding to an electronic module and configured to transmit a first signal, and the wireless transmission module includes a corresponding surface, a base assembly and a first coil. The corresponding surface faces the electronic module and is perpendicular to a main axis. The first coil is disposed in the base assembly. The first coil overlaps at least a portion of the base assembly when viewed along the main axis. The first coil overlaps at least a portion of the base assembly when viewed in a direction that is perpendicular to the main axis.

According to some embodiments, the base assembly includes a first magnetically conductive portion having a first magnetically conductive material. The base assembly includes a plurality of first magnetically conductive elements. The base assembly includes iron elements. The base assembly includes silicon elements. The base assembly includes chromium elements. The diameter of the first magnetically conductive element is less than 0.05 mm.

According to some embodiments, the wireless transmission module further includes a first adhesive element configured to adhere to the first magnetically conductive elements. The first adhesive element is in direct contact with the first magnetically conductive elements. The first adhesive element is in direct contact with the first coil. The first coil is fixedly connected to the first magnetically conductive elements through the first adhesive element. The melting point of the first adhesive element is higher than 70 degrees Celsius. The melting point of the first adhesive element is lower than 400 degrees Celsius.

According to some embodiments, when viewed in a first direction, the base assembly covers at least a portion of the first coil. The first direction is opposite to the direction in which the corresponding surface is facing. The base assembly further includes: a supporting portion, configured to support the first coil; and a covering portion, covering a portion of the first coil. When viewed in a direction that is perpendicular to the main axis, the first coil is located between the supporting portion and the electronic module. When viewed along the main axis, the first coil overlaps at least a portion of the supporting portion. When viewed in the first direction, at least a portion of the covering portion overlaps the first coil. When viewed in a direction that is perpendicular to the main axis, at least a portion of the covering portion overlaps the first coil. When viewed in a direction that is perpendicular to the main axis, in the main axis, the center of the first coil is located between the covering portion and the supporting portion.

According to some embodiments, the first coil includes: a first leading wire, located at a first sidewall surface of the base assembly; and an enhancement element, disposed on the first leading wire. The first sidewall surface is parallel to the main axis. The first leading wire passes through a first opening of the first sidewall surface. The first opening has a closed structure. The enhancement element is in direct contact with the first opening. The enhancement element has a non-metallic material. In the main axis, the shortest distance between the first coil and the corresponding surface is different from the shortest distance between the first leading wire and the corresponding surface. In the main axis, the shortest distance between the first coil and the corresponding surface is less than the shortest distance between the first leading wire and the corresponding surface. The base assembly further includes a first base surface facing the electronic module. The first base surface is not parallel to the first sidewall surface.

According to some embodiments, the base assembly further includes a first structural strengthening portion configured to strengthen the mechanical structure of the base assembly. The first structural strengthening portion is located between the first base surface and the first sidewall surface. A surface of the first structural strengthening portion is not parallel to the first base surface and the first sidewall surface. An included angle between the surface of the first structural strengthening portion and the first base surface is greater than 15 degrees. An included angle between the surface of the first structural strengthening portion and the first sidewall surface is greater than 15 degrees. The base assembly further includes a second base surface, and the second base surface and the first base surface face in opposite directions.

According to some embodiments, the base assembly further includes a second structural strengthening portion configured to strengthen the mechanical structure of the base assembly. The second structural strengthening portion is located between the second base surface and the first sidewall surface. A surface of the second structural strengthening portion is not parallel to the second base surface and the first sidewall surface. A structure of the second structural strengthening portion is different from a structure of the first structural strengthening portion. The surface of the second structural strengthening portion has a radius of curvature which is greater than 0.05 mm. When viewed along the main axis, the first structural strengthening portion overlaps at least a portion of the second structural strengthening portion. The wireless transmission module further includes a second coil, which is disposed in the base assembly. The second coil is electrically independent from the first coil. One of the first coil and the second coil is configured to transmit the first signal, and the other one is configured to transmit a second signal. When viewed in a direction that is perpendicular to the main axis, the second coil overlaps at least a portion of the first coil.

According to some embodiments, the base assembly further includes a first base surface facing the electronic module. The base assembly further includes a second base surface, and the second base surface and the first base surface face in opposite directions. The wireless transmission module further includes a second coil, which is disposed in the base assembly. The second coil is electrically independent from the first coil. The wireless transmission module further includes a first protection element disposed on the first coil. The first protection element has a plate-shaped structure and is in direct contact with the first base surface. The first protection element is in direct contact with the first coil. The first protection element is in direct contact with the second coil. The first protection element includes a first adhesive portion configured to adhere to the first coil. The first adhesive portion is adhered to the first base surface. The first adhesive portion is adhered to the covering portion. When viewed in a direction that is perpendicular to the main axis, the first coil is located between the supporting portion and the first protection element. The first protection element further includes a first body, and the first adhesive portion is disposed on the first body. The first protection element further includes a second adhesive portion configured to be attached to a first external element. The first body is located between the first adhesive portion and the second adhesive portion. The first external element is a casing of an electronic device.

According to some embodiments, the base assembly further includes a first structural strengthening portion configured to strengthen the mechanical structure of the base assembly. When viewed along the main axis, the first protection element overlaps at least a portion of the first structural strengthening portion. The first adhesive portion is adhered to the first structural strengthening portion. The wireless transmission module further includes a second protection element disposed on the second base surface. The second protection element has a plate-shaped structure. When viewed in a direction that is perpendicular to the main axis, the supporting portion is located between the first coil and the second protection element. The second protection element includes a third adhesive portion configured to be attached to the second base surface. The second protection element further includes a second body, and the third adhesive portion is disposed on the second body. The second protection element further includes a fourth adhesive portion configured to be attached to a second external element. The second body is located between the third adhesive portion and the fourth adhesive portion. The second external component is a circuit assembly of the electronic device.

According to some embodiments, the base assembly further includes a second structural strengthening portion configured to strengthen the mechanical structure of the base assembly. When viewed along the main axis, the second protection element overlaps at least a portion of the second structural strengthening portion. The third adhesive portion is adhered to the second structural strengthening portion. The first protection element is in direct contact with the second protection element. The first adhesive portion is adhered to the third adhesive portion.

According to some embodiments, the base assembly further includes: a first trench, located on the second base surface; a second trench located on the second base surface; and a third trench, located on the second base surface. The third adhesive portion corresponds to the first trench. The first trench extends to the first coil. When viewed in a direction that is perpendicular to the main axis, the first trench does not overlap the first coil. When viewed along the main axis, the first trench overlaps at least a portion of the first coil. When viewed in a direction that is perpendicular to the main axis, the second trench overlaps at least a portion of the first coil. The second trench is located on the first base surface. The first adhesive portion corresponds to the second trench. The third adhesive portion corresponds to the second trench. In the main axis, the maximum size of the first trench is different from the maximum size of the second trench. In the main axis, the maximum size of the first trench is smaller than the maximum size of the second trench. When viewed in a direction that is perpendicular to the main axis, the third trench does not overlap the second coil. When viewed along the main axis, the third trench overlaps at least a portion of the second coil. The third adhesive portion corresponds to the third trench. In the main axis, the maximum size of the third trench is smaller than the maximum size of the second trench.

According to some embodiments, the wireless transmission module further includes a first conductive element. The first coil is electrically connected to an external circuit through the first conductive element. The first conductive element has a plate-shaped structure. The first conductive element has a metal material. At least a portion of the first conductive element is buried in and not exposed from the base assembly. A surface of a first external electrical connection portion of the first conductive element is perpendicular or parallel to the main axis. The first external electrical connection portion is configured to be electrically connected to the external circuit. A portion of the first external electrical connection portion is exposed from the base assembly. A surface of a first internal electrical connection portion of the first conductive element is perpendicular or parallel to the main axis. The first internal electrical connection portion is configured to be electrically connected to the first coil. The first internal electrical connection portion is exposed from the base assembly. The wireless transmission module further includes a first reinforcing element that is in direct contact with the first internal electrical connection portion. A first conducting wire of the first coil has a first cross-section, the first conducting element has a second cross-section, and the first cross-section and the second cross-section have different structures. The first cross-section has a circular arc structure. The second cross-section has a polygonal structure.

According to some embodiments, the wireless transmission module further includes: an electronic component, disposed on the base assembly; a second conductive element, wherein the electronic component is electrically connected to the external circuit through the second conductive element; and a third conductive element, wherein the second coil is electrically connected to the external circuit through the third conductive element. The second conductive element has a plate-shaped structure. The second conductive element has a metal material. At least a portion of the second conductive element is buried in and not exposed from the base assembly. A surface of a second external electrical connection portion of the second conductive element is perpendicular or parallel to the main axis. The second external electrical connection portion is configured to be electrically connected to the external circuit. The second external electrical connection portion is exposed from the base assembly. The surface of the first external electrical connection portion is parallel to the surface of the second external electrical connection portion. The surface of the first external electrical connection portion and the surface of the second external electrical connection portion are coplanar. A surface of the first external electrical connection portion facing the first coil and the surface of the first internal electrical connection portion facing the first coil are located on different planes. A surface of a second internal electrical connection portion of the second conductive element is perpendicular or parallel to the main axis. The second internal electrical connection portion is configured to be electrically connected to the electronic component. The second internal electrical connection portion is exposed from the base assembly. The second conductive element has a second cross-section, and the second cross-section has a polygonal structure. The surface of the first internal electrical connection portion is parallel to the surface of the second internal electrical connection portion. The surface of the first internal electrical connection portion and the surface of the second internal electrical connection portion are coplanar.

According to some embodiments, the third conductive element has a plate-shaped structure. The third conductive element has a metal material. At least a portion of the third conductive element is buried in and not exposed from the base assembly. A surface of a third external electrical connection portion of the third conductive element is perpendicular or parallel to the main axis. The third external electrical connection portion is configured to be electrically connected to the external circuit. The third external electrical connection portion is exposed from the base assembly. A surface of a third internal electrical connection portion of the third conductive element is perpendicular or parallel to the main axis. The third internal electrical connection portion is configured to be electrically connected to the second coil. The third internal electrical connection portion is exposed from the base assembly. The surface of the third internal electrical connection portion and the surface of the first internal electrical connection portion are coplanar.

According to some embodiments, the wireless transmission module further includes: a second reinforcing element, directly contacting the second internal electrical connection portion; a third reinforcing element, directly contacting the third internal electrical connection portion; and a fourth reinforcing element, directly contacting the first external electrical connection portion. The second reinforcing element has a non-metallic material. The third reinforcing element has a non-metallic material. The first reinforcing element and the fourth reinforcing element are integrally formed. The electronic component is disposed in a receiving portion of the base assembly. The receiving portion has a concave structure and is located on the first base surface. The wireless transmission module further includes a first protection element disposed on the first coil. The first protection element includes an opening corresponding to the receiving portion. When viewed in the first direction, at least a portion of the electronic component is exposed from the opening. At least a portion of the first coil is exposed from the receiving portion. In the main axis, the maximum size of a first induction body of the first coil is different from the maximum size of the base assembly. In the main axis, the maximum size of the first induction body is less than the maximum size of the base assembly. In the main axis, the maximum size of the first induction body is less than one third of the maximum size of the base assembly.

According to some embodiments, the wireless transmission module further includes a second coil disposed in the base assembly. The base assembly further includes: a first induction portion, corresponding to the first coil and having a first characteristic function; and a second induction portion, corresponding to the second coil and having a second characteristic function. When viewed along the main axis, the first induction portion overlaps at least a portion of the first coil. When viewed along the main axis, the second induction portion overlaps at least a portion of the second coil. When corresponding to an electromagnetic wave with a first frequency, the first and second characteristic functions are different. The base assembly further includes a second magnetically conductive portion, and the second magnetically conductive portion and the first magnetically conductive portion have different materials. When viewed along the main axis, the second magnetically conductive portion overlaps at least one of the first coil and the second coil. The first induction portion covers a portion of the first magnetically conductive portion. The second induction portion covers a portion of the second magnetically conductive portion.

According to some embodiments, when viewed along the main axis, the second magnetically conductive portion overlaps at least a portion of the first magnetically conductive portion. When viewed in a direction that is perpendicular to the main axis, the second magnetically conductive portion does not overlap the first magnetically conductive portion. In the main axis, the maximum size of the first induction portion is different from the maximum size of the second induction portion. The external circuit includes a receiving space configured to receive at least a portion of the base assembly. The receiving space has an opening structure. When viewed in a direction that is perpendicular to the main axis, the external circuit overlaps at least a portion of the base assembly. When viewed along the main axis, the external circuit overlaps at least a portion of the base assembly.

According to some embodiments, when viewed in a direction that is perpendicular to the main axis, the external circuit overlaps at least a portion of the first magnetically conductive portion. When viewed in a direction that is perpendicular to the main axis, the external circuit overlaps at least a portion of the first coil. When viewed in a direction that is perpendicular to the main axis, the external circuit overlaps at least a portion of the second coil. The base assembly defines a first overlapping portion, and when viewed in a direction that is perpendicular to the main axis, the external circuit overlaps the first overlapping portion. When viewed along the main axis, the external circuit does not overlap the first overlapping portion. When viewed along the main axis, there is a gap between the first overlapping portion and the external circuit.

According to some embodiments, when viewed in a direction that is perpendicular to the main axis, the external circuit does not overlap the first coil. When viewed along the main axis, the external circuit does not overlap with the first coil. When viewed along the main axis, the external circuit overlaps at least a portion of the second coil. When viewed in a direction that is perpendicular to the main axis, the external circuit overlaps at least a portion of the second magnetically conductive portion.

According to some embodiments, the base assembly defines a first overlapping portion, a second overlapping portion and a third overlapping portion. When viewed in a direction that is perpendicular to the main axis, the external circuit overlaps the first overlapping portion. When viewed along the main axis, the external circuit does not overlap the first overlapping portion. When viewed along the main axis, the external circuit overlaps the second overlapping portion. When viewed in a direction that is perpendicular to the main axis, the external circuit does not overlap the second overlapping portion. When viewed along the main axis, the external circuit overlaps the third overlapping portion. When viewed in a direction that is perpendicular to the main axis, the external circuit does not overlap the third overlapping portion. When viewed in a direction that is perpendicular to the main axis, the external circuit is located between the second overlapping portion and the third overlapping portion. The first overlapping portion, the second overlapping portion and the third overlapping portion are integrally formed as one piece. The first overlapping portion is in contact with the external circuit.

The present disclosure provides a wireless transmission module for transmitting energy or signals, including a base assembly and at least one coil. The coil is disposed in the base assembly, and the base assembly is composed of a plurality of magnetically conductive elements. After being heated and pressurized, these magnetically conductive elements are connected to each other, so that the base assembly forms a solid plate-shaped structure, and the coil can be firmly fixed in the base assembly.

Based on the design of the wireless transmission module of the present disclosure, the coils can be fixed in the base assembly without using glue or tape, so that the mechanical strength, usage efficiency, charging efficiency, heat dissipation efficiency can be improved, overall miniaturization and overall lightweight can be achieved, and the electromagnetic interference can be reduced, and so on.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
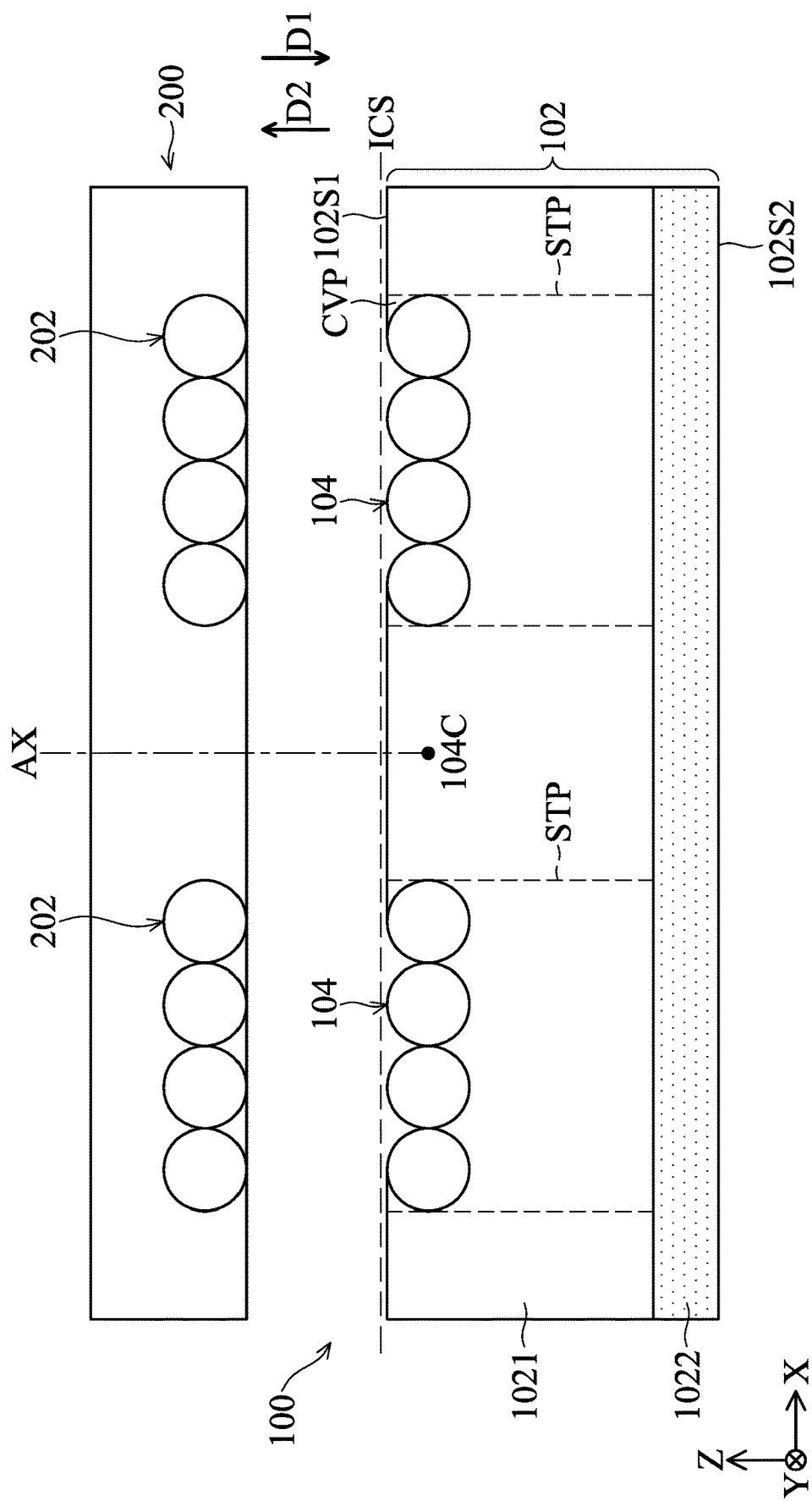
FIG. 1 is a schematic cross-sectional view of a wireless transmission module 100 and an electronic module 200 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Please refer to FIG. 1, which is a schematic cross-sectional view of a wireless transmission module 100 and an electronic module 200 according to an embodiment of the present disclosure. The wireless transmission module 100 is a wireless transmission module that can be used to transmit energy or signals, and the electronic module 200 is, for example, an electronic device with a coil 202. As shown in FIG. 1, the wireless transmission module 100 corresponds to the electronic module 200 and is configured to transmit a first signal, and the first signal may be, for example, a charging signal. In this embodiment, the wireless transmission module 100 may include a base assembly 102 and a first coil 104, and the first coil 104 is disposed in the base assembly 102.

In this embodiment, the first coil 104 can serve as a charging coil to be wireless charged by an external charging device. For example, the first coil 104 can operate as a resonant charging coil based on the standard of the Alliance for Wireless Power (A4WP), but it is not limited thereto. In addition, the first coil 104 can operate as an inductive charging coil based on the standard of Wireless Power Consortium (WPC), such as the Qi standard. Therefore, the first coil 104 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first coil 104 can also be used as a communication coil, for example, operating in Near Field Communication (NFC) mode to communicate with external electronic devices (such as the coil 202 of the electronic module 200).

As shown in FIG. 1, the wireless transmission module 100 may define a corresponding surface ICS, which faces the electronic module 200 and is perpendicular to a main axis AX. The main axis AX is, for example, the winding axis of the first coil 104, but it is not limited thereto. The first coil 104 overlaps at least a portion of the base assembly 102 when viewed along the main axis AX. The first coil 104 overlaps at least a portion of the base assembly 102 when viewed in a direction that is perpendicular to the main axis AX.

The base assembly 102 may include a first base surface 102S1 and a second base surface 102S2, the first base surface 102S1 faces the electronic module 200, and the first base surface 102S1 and the second base surface 102S2 face different directions. In this embodiment, the corresponding surface ICS is an imaginary surface that completely overlaps the first base surface 102S1 (a plane). It should be noted that when the first base surface 102S1 is non-planar, the corresponding surface ICS is also correspondingly non-planar, for example, a curved surface.

Figure 2:
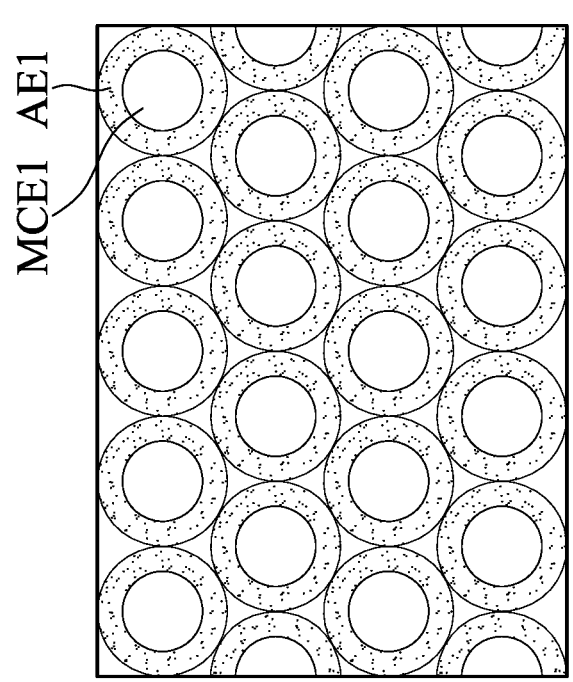
FIG. 2 is an enlarged view of the structure of the base assembly 102 before pressure and heating according to an embodiment of the present disclosure.

Please refer to FIG. 1 and FIG. 2. FIG. 2 is an enlarged view of the structure of the base assembly 102 before pressure and heating according to an embodiment of the present disclosure. In this embodiment, the base assembly 102 includes a first magnetically conductive portion 1021 having a first magnetically conductive material. For example, the first magnetically conductive material may include iron elements, silicon elements or chromium elements. That is, the base assembly 102 may include iron elements, the base assembly 102 may include silicon elements, and the base assembly 102 may include chromium elements.

As shown in FIG. 2, the first magnetically conductive portion 1021 of the base assembly 102 includes a plurality of first magnetically conductive elements MCE1, and the first magnetically conductive elements MCE1 can be in the form of powder or sheet. The maximum diameter of these first magnetically conductive elements MCE1 is less than 0.05 mm. Furthermore, the wireless transmission module 100 further includes a first adhesive element AE1, which is configured to be adhered to the first magnetically conductive elements MCE1. Specifically, as shown in FIG. 2, each first magnetically conductive element MCE1 is surrounded by one first adhesive element AE1.

Figure 3:
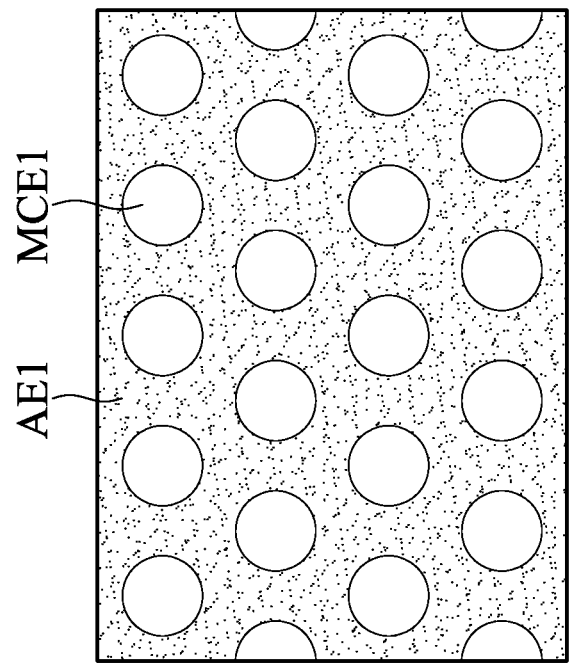
FIG. 3 is an enlarged view of the structure of the base assembly 102 after being pressurized and heated according to an embodiment of the present disclosure.

Next, please refer to FIG. 2 and FIG. 3. FIG. 3 is an enlarged view of the structure of the base assembly 102 after being pressurized and heated according to an embodiment of the present disclosure. As shown in FIG. 3, the first adhesive elements AE1 are melted to connect these first magnetically conductive elements MCE1 together after being pressurized and heated. That is, the first adhesive elements AE1 are in direct contact with these first magnetically conductive elements MCE1.

Furthermore, the melted first adhesive element AE1 are also in direct contacts with the first coil 104, so that the first coil 104 is fixedly connected to the first magnetically conductive elements MCE1 via the first adhesive elements AE1. In this embodiment, the melting point of the first adhesive element AE1 is higher than 70 degrees Celsius, and the melting point of the first adhesive element AE1 is lower than 400 degrees Celsius, but they are not limited thereto.

In addition, in this embodiment, the base assembly 102 may further include a second magnetically conductive portion 1022 which is connected to the first magnetically conductive portion 1021, and the second magnetically conductive portion 1022 and the first magnetically conductive portion 1021 have different materials. For example, the second magnetically conductive portion 1022 is composed of a plurality of second magnetically conductive elements of different materials. For example, the first magnetically conductive element can be made of iron, and the second magnetically conductive element can be made of chromium. Similar to the first magnetically conductive portion 1021, the second magnetically conductive elements can be connected to each other by a second adhesive element, so the configuration thereof is not be described in detail.

As shown in FIG. 1, when viewed in a first direction D1, the base assembly 102 covers at least a portion of the first coil 104. The first direction D1 is opposite to a direction D2 that the corresponding surface ICS faces. The base assembly 102 may include at least one supporting portion STP and at least one covering portion CVP. The supporting portion STP is configured to support the first coil 104, and the covering portion CVP is configured to cover a portion of the first coil 104.

The first coil 104 is located between the supporting portion STP and the electronic module 200 when viewed in a direction that is perpendicular to the main axis AX (such as the Y-axis). The first coil 104 overlaps at least a portion of the supporting portion STP when viewed along the main axis AX.

At least a portion of the covering portion CVP overlaps the first coil 104 when viewed in the first direction D1. At least a portion of the covering portion CVP overlaps the first coil 104 when viewed in a direction that is perpendicular to the main axis AX (such as the X-axis). The center 104C of the first coil 104 is located between the covering portion CVP and the supporting portion STP along the main axis AX when viewed in the direction perpendicular to the main axis AX.

Figure 4:
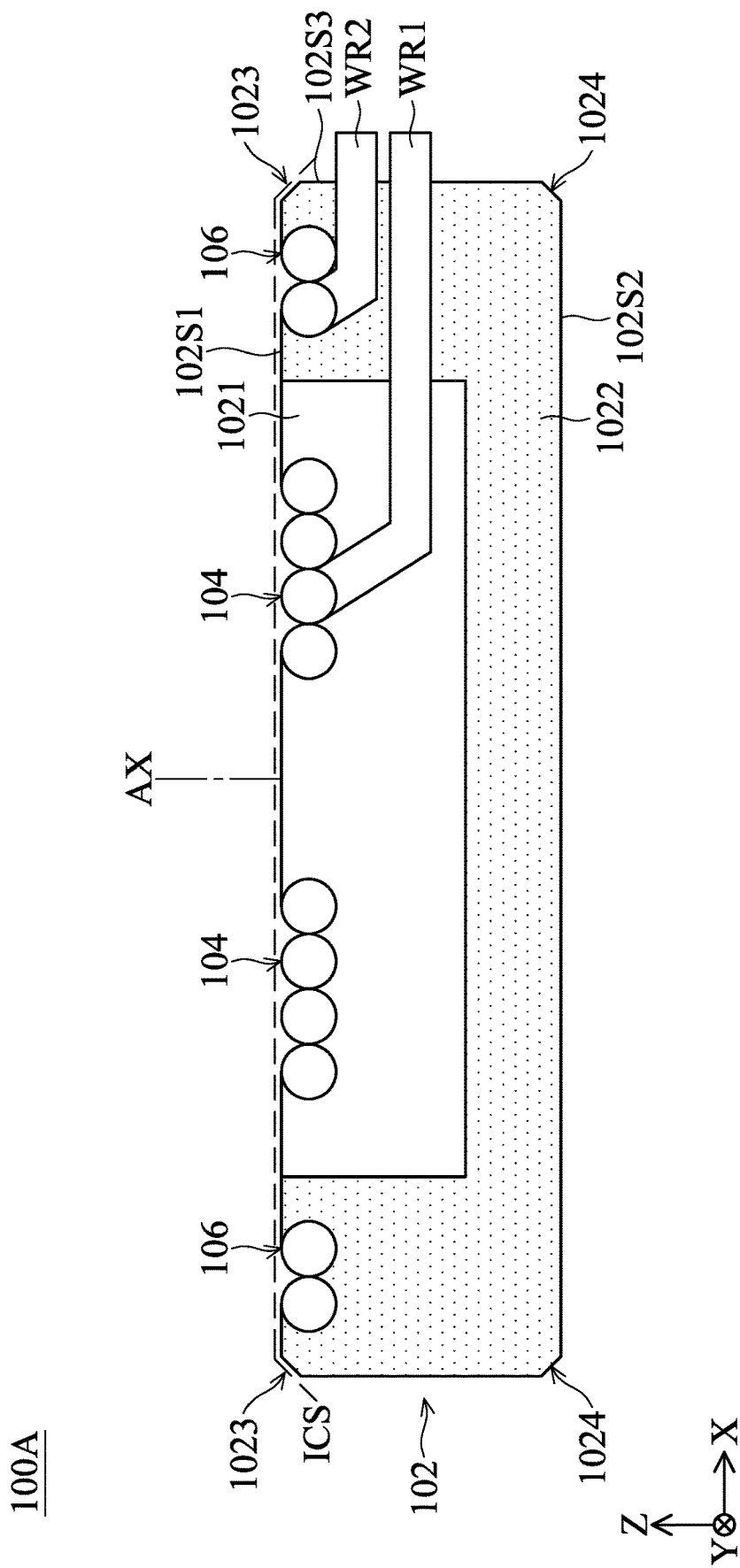
FIG. 4 is a schematic cross-sectional view of a wireless transmission module 100A according to another embodiment of the present disclosure.
Figure 5:
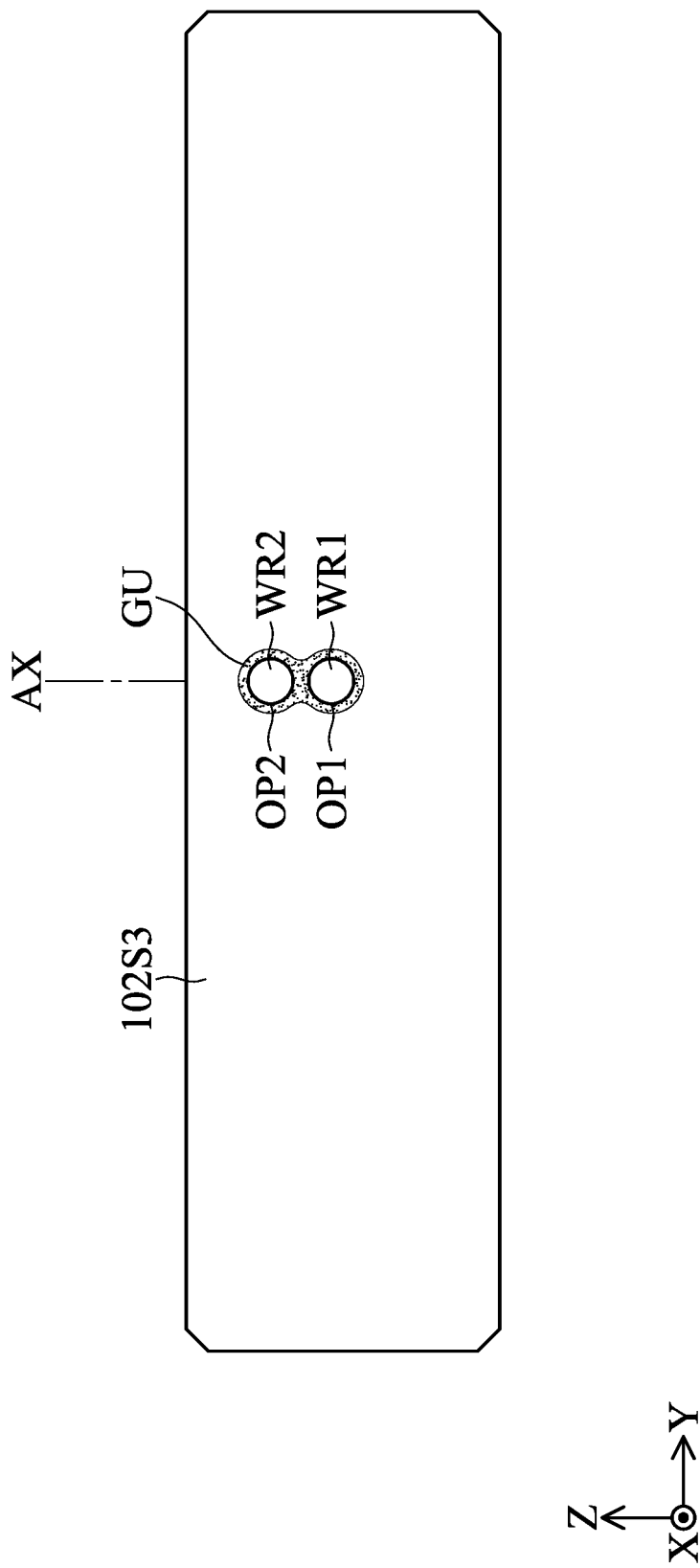
FIG. 5 is a side view of the wireless transmission module 100A according to another embodiment of the present disclosure.

Please refer to FIG. 4 and FIG. 5. FIG. 4 is a schematic cross-sectional view of a wireless transmission module 100A according to another embodiment of the present disclosure, and FIG. 5 is a side view of the wireless transmission module 100A according to another embodiment of the present disclosure. Similar to the previous embodiment, the wireless transmission module 100A has a first magnetically conductive portion 1021 and a second magnetically conductive portion 1022.

As shown in FIG. 4, the second magnetically conductive portion 1022 has a U-shaped structure surrounding the first magnetically conductive portion 1021. Furthermore, the wireless transmission module 100A of this embodiment further includes a second coil 106 disposed in the second magnetically conductive portion 1022 of the base assembly 102. The second magnetically conductive portion 1022 overlaps at least a portion of the first magnetically conductive portion 1021 when viewed along a direction perpendicular to the main axis AX.

In this embodiment, the first coil 104 includes a first leading wire WR1 and an enhancement element GU, and the second coil 106 includes a second leading wire WR2. The first leading wire WR1 and the second leading wire WR2 are located at a first sidewall surface 102S3 of the base assembly 102, and the enhancement element GU is disposed on the first leading wire WR1 and the second leading wire WR2.

The first sidewall surface 102S3 is parallel to the main axis AX. The first leading wire WR1 passes through a first opening OP1 of the first sidewall surface 102S3, and the second leading wire WR2 passes through a second opening OP2 of the first sidewall surface 102S3. The first opening OP1 and the second opening OP2 have a closed structure. That is, as shown in FIG. 5, the contours of the first opening OP1 and the second opening OP2 are closed.

In this embodiment, the enhancement element GU is direct in contact with the first opening OP1 and the second opening OP2. The enhancement element GU has a non-metallic material, and the enhancement element GU is, for example, glue, but it is not limited thereto. The enhancement element GU can avoid the problem that the first leading wire WR1 and the second leading wire WR2 are easily broken.

As shown in FIG. 4, in the main axis AX, the shortest distance between the first coil 104 and the corresponding surface ICS is different from the shortest distance between the first leading wire WR1 and the corresponding surface ICS. For example, in the main axis AX, the shortest distance between the first coil 104 and the corresponding surface ICS is less than the shortest distance between the first leading wire WR1 and the corresponding surface ICS.

Similarly, the base assembly 102 includes a first base surface 102S1 facing an electronic module (not shown in the figures), and the first base surface 102S1 is not parallel to the first sidewall surface 102S3.

Furthermore, the base assembly 102 may further include at least a first structural strengthening portion 1023 configured to strengthen the mechanical structure of the base assembly 102. The first structural strengthening portion 1023 is located between the first base surface 102S1 and the first sidewall surface 102S3. The first structural strengthening portion 1023 is, for example, a surface (an inclined surface), which is not parallel to the first base surface 102S1 and the first sidewall surface 102S3.

In this embodiment, the included angle between the surface of the first structural strengthening portion 1023 and the first base surface 102S1 is greater than 15 degrees, and the included angle between the surface of the first structural strengthening portion 1023 and the first sidewall surface 102S3 is greater than 15 degrees, but they are not limited thereto. In other embodiments, the first structural strengthening portion 1023 is, for example, a curved surface with a radius of curvature which is greater than 0.05 mm.

Similarly, the second base surface 102S2 and the first base surface 102S1 face opposite directions. Furthermore, the base assembly 102 may further include at least a second structural strengthening portion 1024 configured to strengthen the mechanical structure of the base assembly 102. The second structural strengthening portion 1024 is located between the second base surface 102S2 and the first sidewall surface 102S3.

The surface of the second structural strengthening portion 1024 is not parallel to the second base surface 102S2 and the first sidewall surface 102S3. The first structural strengthening portion 1023 overlaps at least a portion of the second structural strengthening portion 1024 when viewed along the main axis AX.

In this embodiment, the structure of the second structural strengthening portion 1024 is different from that of the first structural strengthening portion 1023. Specifically, the surface of the second structural strengthening portion 1024 is a curved surface with a radius of curvature which is greater than 0.05 mm, but it is not limited thereto. In other embodiments, the second structural strengthening portion 1024 can also be a plane, and the included angle between the plane and the second base surface 102S2 and the included angle between the plane and the first sidewall surface 102S3 are both greater than 15 degrees.

In this embodiment, the second coil 106 and the first coil 104 are electrically independent. One of the first coil 104 and the second coil 106 is configured to transmit the first signal (such as a charging signal), and the other one is configured to transmit a second signal (such as a communication signal). The second coil 106 overlaps at least a portion of the first coil 104 when viewed in a direction that is perpendicular to the main axis AX (such as the X-axis).

Figure 6:
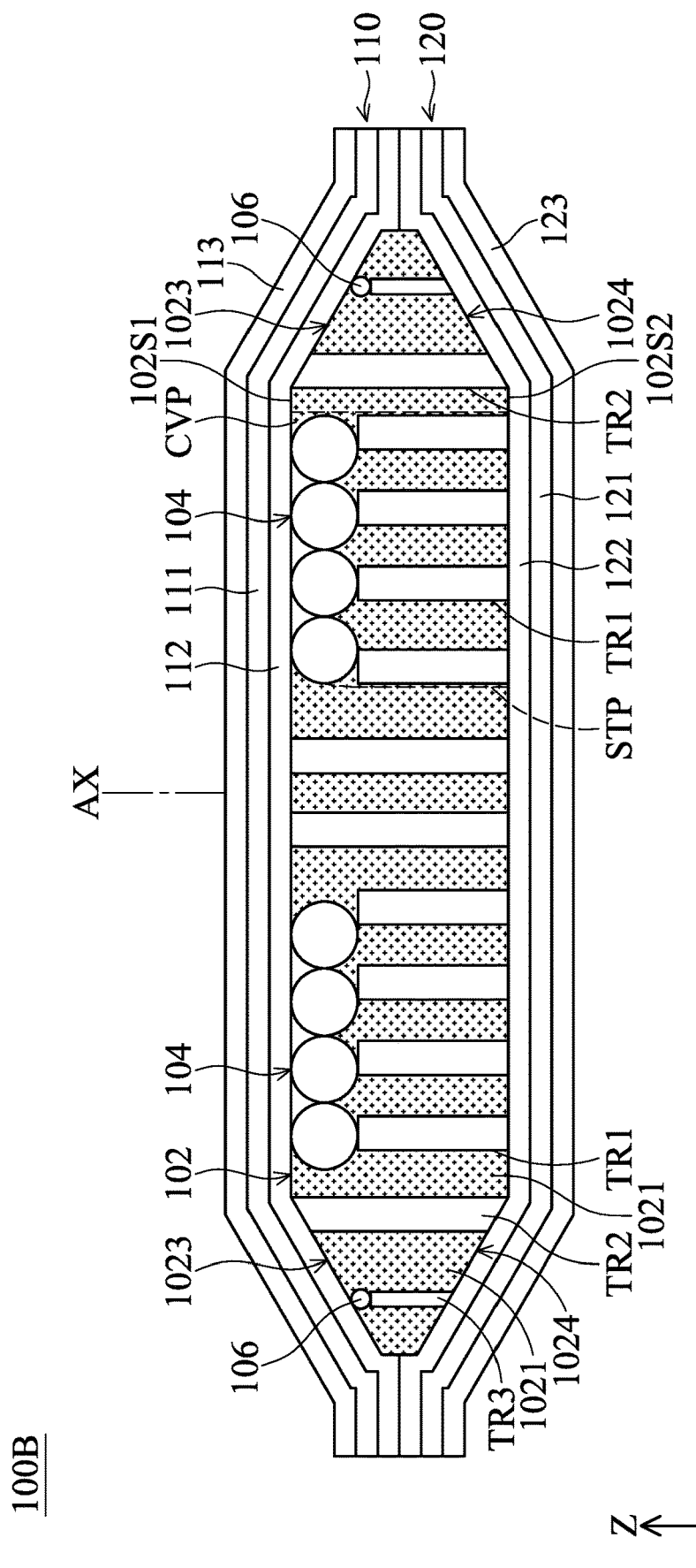
FIG. 6 is a schematic cross-sectional view of a wireless transmission module 100B according to another embodiment of the present disclosure.

Next, please refer to FIG. 6, which is a schematic cross-sectional view of a wireless transmission module 100B according to another embodiment of the present disclosure. In this embodiment, the wireless transmission module 100B may further include a first protection element 110 disposed on the first coil 104 and the second coil 106. The first protection element 110 can be a double-sided tape, for example, made of polyethylene terephthalate (PET), but it is not limited thereto.

The first protection element 110 has a plate-shaped structure and is in direct contact with the first base surface 102S1. The first protection element 110 is in direct contact with the first coil 104 and the second coil 106. The first protection element 110 may include a first adhesive portion 112 configured to adhere to the first coil 104 and the second coil 106.

Furthermore, the first adhesive portion 112 is adhered to the first base surface 102S1, and the first adhesive portion 112 is adhered to the covering portion CVP. When viewed in a direction that is perpendicular to the main axis AX, the first coil 104 is located between the supporting portion STP and the first protection element 110.

The first protection element 110 further includes a first body 111, and the first adhesive portion 112 is disposed on the first body 111. The first protection element 110 further includes a second adhesive portion 113 configured to be attached to a first external element (not shown in the figures). The first body 111 is located between the first adhesive portion 112 and the second adhesive portion 113, and the first external element is a casing of an electronic device. The electronic device can be, for example, a smartphone, and the housing casing is, for example, a back cover of the smartphone, but they are not limited thereto.

Similar to the previous embodiments, the base assembly 102 also includes a first structural strengthening portion 1023 configured to strengthen the mechanical structure of the base assembly 102. When viewed along the main axis AX, the first protection element 110 overlaps at least a portion of the first structural strengthening portion 1023. For example, the first adhesive portion 112 is adhered to the first structural strengthening portion 1023.

Furthermore, the wireless transmission module 100 may further include a second protection element 120 disposed on the second base surface 102S2. Similar to the first protection element 110, the second protection element 120 has a plate-shaped structure. When viewed in a direction that is perpendicular to the main axis AX, the supporting portion STP is located between the first coil 104 and the second protection element 120.

The second protection element 120 includes a third adhesive portion 122 configured to be attached to the second base surface 102S2. The second protection element 120 further includes a second body 121, and the third adhesive portion 122 is disposed on the second body 121. The second protection element 120 further includes a fourth adhesive portion 123 configured to be attached to a second external element, and the second body 121 is located between the third adhesive portion 122 and the fourth adhesive portion 123.

The second external element is a circuit assembly of the electronic device. For example, the electronic device is a smartphone, and the circuit assembly can be a circuit board of the smartphone, but it is not limited thereto.

Similarly, the base assembly 102 also includes a second structural strengthening portion 1024 configured to strengthen the mechanical structure of the base assembly 102. When viewed along the main axis AX, the second protection element 120 overlaps at least a portion of the second structural strengthening portion 1024. For example, the third adhesive portion 122 is adhered to the second structural strengthening portion 1024.

It should be noted that, in this embodiment, the first protection element 110 is in direct contact with the second protection element 120. Specifically, the first adhesive portion 112 is adhered to the third adhesive portion 122.

In addition, in this embodiment, the base assembly 102 may further include at least one first trench TR1, at least one second trench TR2 and at least one third trench TR3. The first trench TR1 is located on the second base surface 102S2, the second trench TR2 is located on the second base surface 102S2, and the third trench TR3 is located on the second base surface 102S2.

As shown in FIG. 6, the third adhesive portion 122 corresponds to the first trench TR1, and the first trench TR1 extends to the first coil 104. When viewed in a direction that is perpendicular to the main axis AX, the first trench TR1 does not overlap the first coil 104. When viewed along the main axis AX, the first trench TR1 overlaps at least a portion of the first coil 104.

When viewed in a direction that is perpendicular to the main axis AX, the second trench TR2 overlaps at least a portion of the first coil 104. The second trench TR2 is located on the first base surface 102S1, the first adhesive portion 112 corresponds to the second trench TR2, and the third adhesive portion 122 corresponds to the second trench TR2. Specifically, the first adhesive portion 112 and the third adhesive portion 122 are configured to adhere to the first magnetically conductive portion 1021 on both sides of the second trench TR2.

In the main axis AX, the maximum size of the first trench TR1 is different from the maximum size of the second trench TR2. For example, in the main axis AX, the maximum size of the first trench TR1 is smaller than the maximum size of the second trench TR2.

When viewed in a direction that is perpendicular to the main axis AX, the third trench TR3 does not overlap the second coil 106. When viewed along the main axis AX, the third trench TR3 overlaps at least a portion of the second coil 106. The third adhesive portion 122 corresponds to the third trench TR3. In the main axis AX, the maximum size of the third trench TR3 is smaller than the maximum size of the second trench TR2.

Based on the structural design of the first trench TR1, the second trench TR2 and the third trench TR3 in this embodiment, the heat dissipation efficiency of the base assembly 102 can be improved, and the base assembly 102 can also be made flexible.

Figure 7:
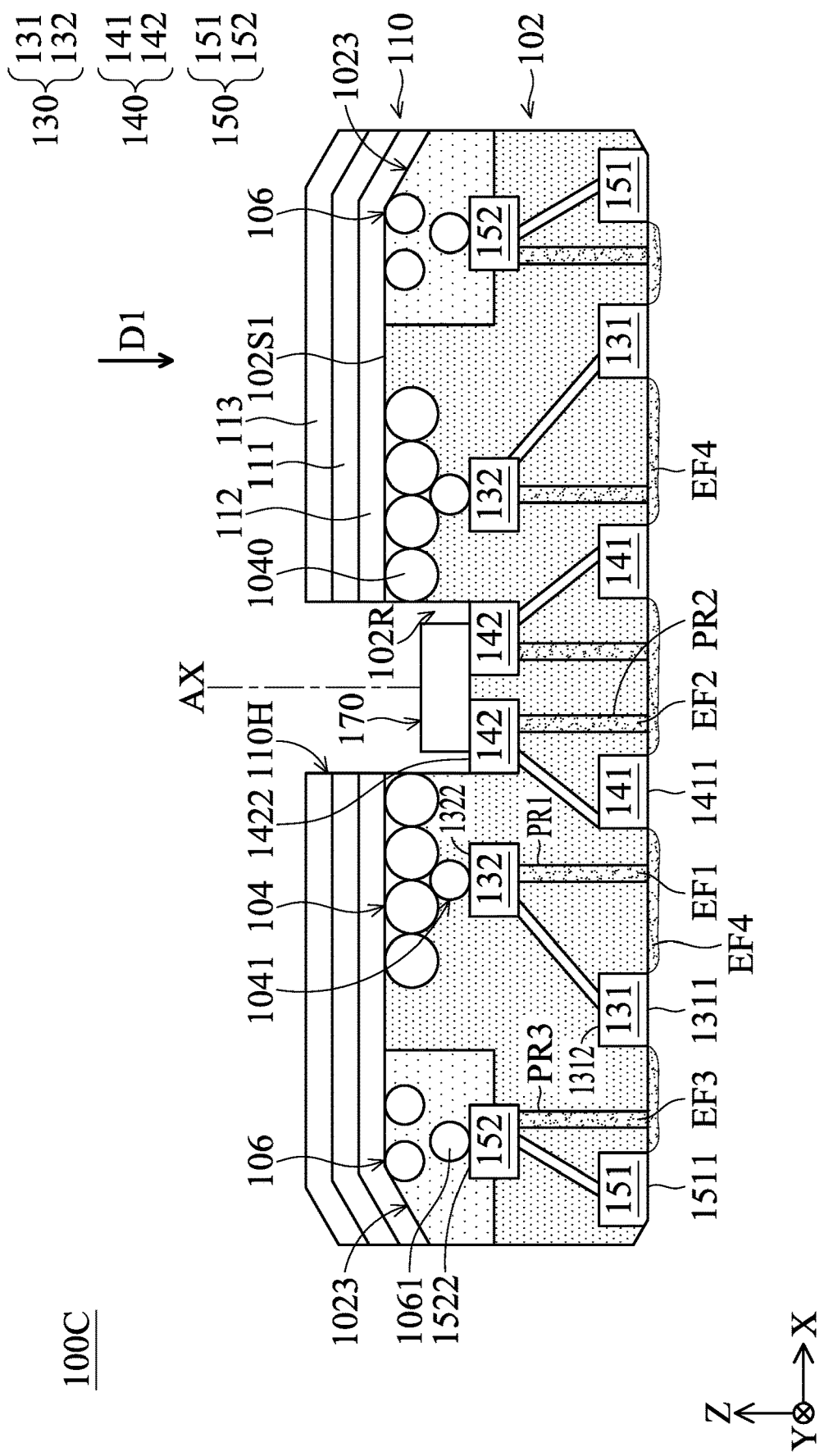
FIG. 7 is a schematic cross-sectional view of a wireless transmission module 100C according to another embodiment of the present disclosure.

Please refer to FIG. 7, which is a schematic cross-sectional view of a wireless transmission module 100C according to another embodiment of the present disclosure. In this embodiment, the wireless transmission module 100C may further include at least one first conductive element 130, and the first coil 104 is electrically connected to an external circuit through the first conductive element 130. The external circuit is, for example, the circuit board of the aforementioned smartphone, but it is not limited thereto.

As shown in FIG. 7, the first conductive element 130 has a plate-shaped structure, and the first conductive element 130 has a metal material. At least a portion of the first conductive element 130 is buried in and not exposed from the base assembly 102.

Furthermore, the surface of a first external electrical connection portion 131 of the first conductive element 130 may be perpendicular or parallel to the main axis AX. For example, the surface 1311 is perpendicular to the main axis AX. The first external electrical connection portion 131 is configured to be electrically connected to the external circuit. A portion (such as the surface 1311) of the first external electrical connection portion 131 is exposed from the base assembly 102.

Similarly, the surface of a first internal electrical connection portion 132 may be perpendicular or parallel to the main axis AX. For example, the surface 1322 is perpendicular to the main axis AX. The first internal electrical connection portion 132 is configured to be electrically connected to the first coil 104.

The first internal electrical connection portion 132 is exposed from the base assembly 102 through a perforation PR1. Furthermore, the wireless transmission module 100C may further include a first reinforcing element EF1 disposed in the perforation PR1 and directly contacting the first internal electrical connection portion 132. The first reinforcing element EF1 can be, for example, glue, but it is not limited thereto.

As shown in FIG. 7, a first conducting wire 1041 of the first coil 104 has a first cross-section, the first conductive element 130 has a second cross-section, and the first cross-section and the second cross-section have different structures. For example, the first cross-section has a circular arc structure, and the second cross-section has a polygonal structure (such as the rectangular structure).

In addition, it should be noted that in other embodiments, the base assembly 102 may not include the perforation PR1. That is, the first internal electrical connection portion 132 is buried in and not exposed from the base assembly 102.

The wireless transmission module 100C further includes an electronic component 170, at least a second conductive element 140 and at least a third conductive element 150. The electronic component 170 can be, for example, a temperature sensor or a magnetic sensor, and so on, and the electronic component 170 is disposed on the base assembly 102. The electronic component 170 can be electrically connected to the external circuit through the second conductive element 140, and the second coil 106 is electrically connected to the external circuit through the third conductive element 150.

Similarly, the second conductive element 140 has a plate-shaped structure, and the second conductive element 140 has a metal material. At least a portion of the second conductive element 140 is buried in and not exposed from the base assembly 102.

Furthermore, the surface of a second external electrical connection portion 141 of the second conductive element 140 may be perpendicular or parallel to the main axis AX. For example, the surface 1411 is perpendicular to the main axis AX. The second external electrical connection portion 141 is configured to be electrically connected to the external circuit. A portion (such as the surface 1411) of the second external electrical connection portion 141 is exposed from the base assembly 102.

As shown in FIG. 7, the surface 1311 of the first external electrical connection portion 131 is parallel to the surface 1411 of the second external electrical connection portion 141. In this embodiment, the surface 1311 of the first external electrical connection portion 131 and the surface 1411 of the second external electrical connection portion 141 are coplanar.

In addition, the surface 1312 of the first external electrical connection portion 131 facing the first coil 104 and the surface 1322 of the first internal electrical connection portion 132 facing the first coil 104 are located on different planes.

As shown in FIG. 7, the surface of a second internal electrical connection portion 142 of the second conductive element 140 may be perpendicular or parallel to the main axis AX. For example, the surface 1422 is perpendicular to the main axis AX. The second internal electrical connection portion 142 is configured to be electrically connected to the electronic component 170, and the second internal electrical connection portion 142 is exposed from the base assembly 102.

The second conductive element 140 has a second cross-section, and the second cross-section has a polygonal structure (such as the rectangular structure). The surface 1322 of the first internal electrical connection portion 132 is parallel to the surface 1422 of the second internal electrical connection portion 142. In this embodiment, the surface 1322 of the first internal electrical connection portion 132 and the surface 1422 of the second internal electrical connection portion 142 are coplanar.

Similarly, the third conductive element 150 has a plate-shaped structure, and the third conductive element 150 has a metal materials. At least a portion of the third conductive element 150 is buried in and not exposed from the base assembly 102.

Furthermore, the surface of a third external electrical connection portion 151 of the third conductive element 150 may be perpendicular or parallel to the main axis AX. For example, the surface 1511 is perpendicular to the main axis AX. The third external electrical connection portion 151 is configured to be electrically connected to the external circuit. A portion (such as the surface 1511) of the third external electrical connection portion 151 is exposed from the base assembly 102.

The surface of a third internal electrical connection portion 152 of the third conductive element 150 may be perpendicular or parallel to the main axis AX. For example, the surface 1522 is perpendicular to the main axis AX. Furthermore, the third internal electrical connection portion 152 is configured to be electrically connected to the second coil 106. Specifically, a leading wire 1061 of the second coil 106 is configured to contact the surface 1522 of the third conductive element 150. Additionally, the surface 1522 of the third internal electrical connection portion 152 and the surface 1322 of the first internal electrical connection portion 132 are coplanar.

Similarly, the third internal electrical connection portion 152 may be exposed from the base assembly 102 through a perforation PR3. Furthermore, the wireless transmission module 100C may further include a third reinforcing element EF3 disposed in the perforation PR3 and directly contacting the third internal electrical connection portion 152. The third reinforcing element EF3 can be, for example, glue, but it is not limited thereto.

Similarly, the second internal electrical connection portion 142 may be exposed from the base assembly 102 through a perforation PR2. Furthermore, the wireless transmission module 100C may further include a second reinforcing element EF2 disposed in the perforation PR2 and directly contacting the second internal electrical connection portion 142. The second reinforcing element EF2 can be, for example, glue, but it is not limited thereto.

In addition, the wireless transmission module 100 may further include a fourth reinforcing element EF4 disposed on the bottom of the base assembly 102 and directly contacting the first external electrical connection portion 131. The second reinforcing element EF2 has a non-metallic material, the third reinforcing element EF3 has a non-metallic material, and the first reinforcing element EF1 and the fourth reinforcing element EF4 are integrally formed.

As shown in FIG. 7, the electronic component 170 is disposed in a receiving portion 102R of the base assembly 102, and the receiving portion 102R has a concave structure and is located on the first base surface 102S1. The first protection element 110 further includes an opening 110H corresponding to the receiving portion 102R.

When viewed in the first direction D1, at least a portion of the electronic component 170 is exposed from the opening 110H. In addition, at least a portion of the first coil 104 is exposed from the receiving portion 102R. Specifically, the first coil 104 can be exposed from the side of the receiving portion 102R, so that the first coil 104 can be positioned by a mold (not shown in the figures).

In the main axis AX, the maximum size of a first induction body 1040 of the first coil 104 (excluding the first conducting wire 1041) is different from the maximum size of the base assembly 102. In the main axis AX, the maximum size of the first induction body 1040 is less than the maximum size of the base assembly 102. In the main axis AX, the maximum size of the first induction body 1040 is less than one third of the maximum size of the base assembly 102.

Figure 8:
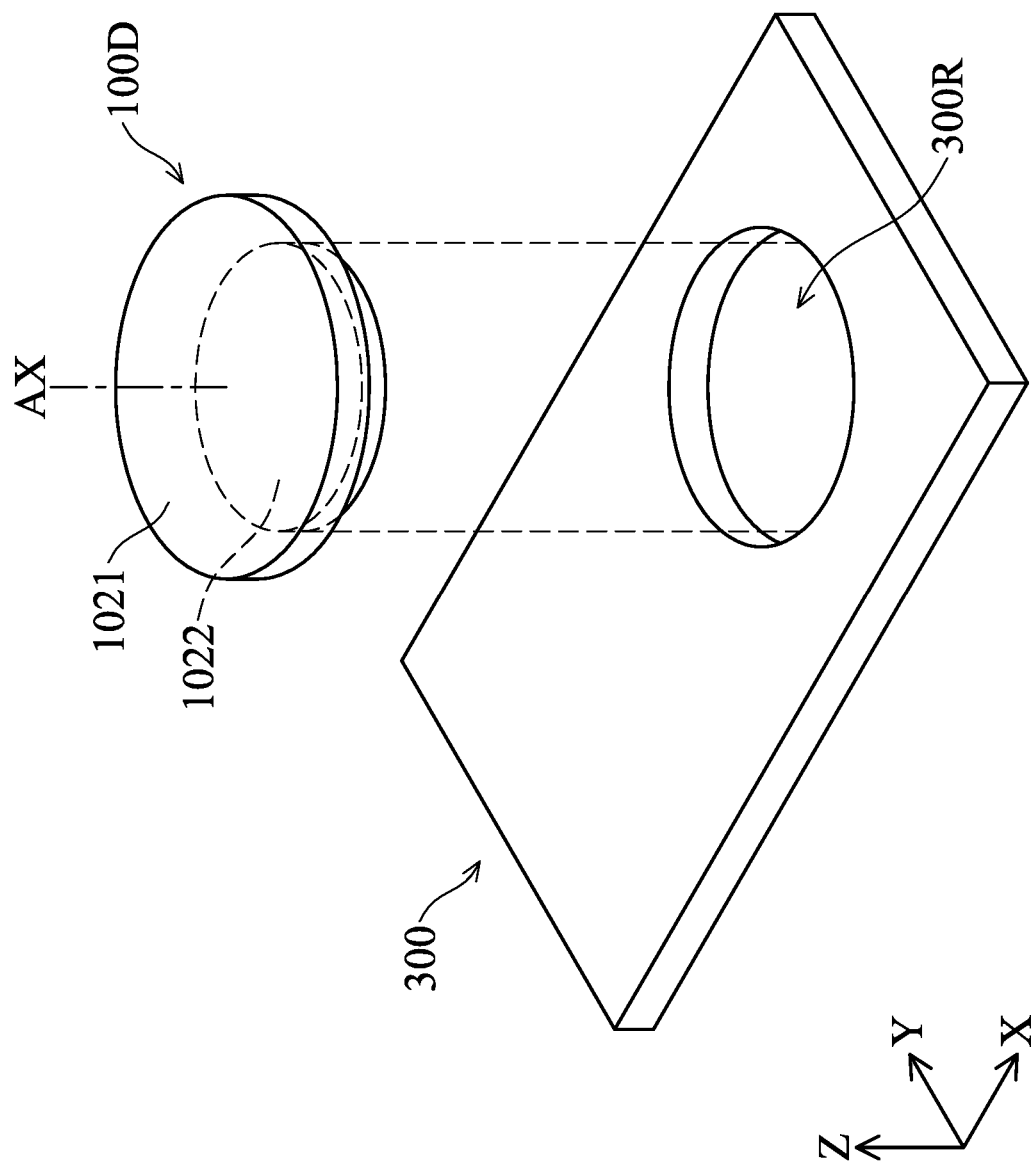
FIG. 8 is a three-dimensional schematic diagram of a wireless transmission module 100D and an external circuit 300 according to another embodiment of the present disclosure.

Next, please refer to FIG. 8. FIG. 8 is a three-dimensional schematic diagram of a wireless transmission module 100D and an external circuit 300 according to another embodiment of the present disclosure. Similar to the foregoing embodiments, the base assembly 102 of the wireless transmission module 100D includes a first magnetically conductive portion 1021 and a second magnetically conductive portion 1022, and the second magnetically conductive portion 1022 and the first magnetically conductive portion 1021 have different materials.

Figure 9:
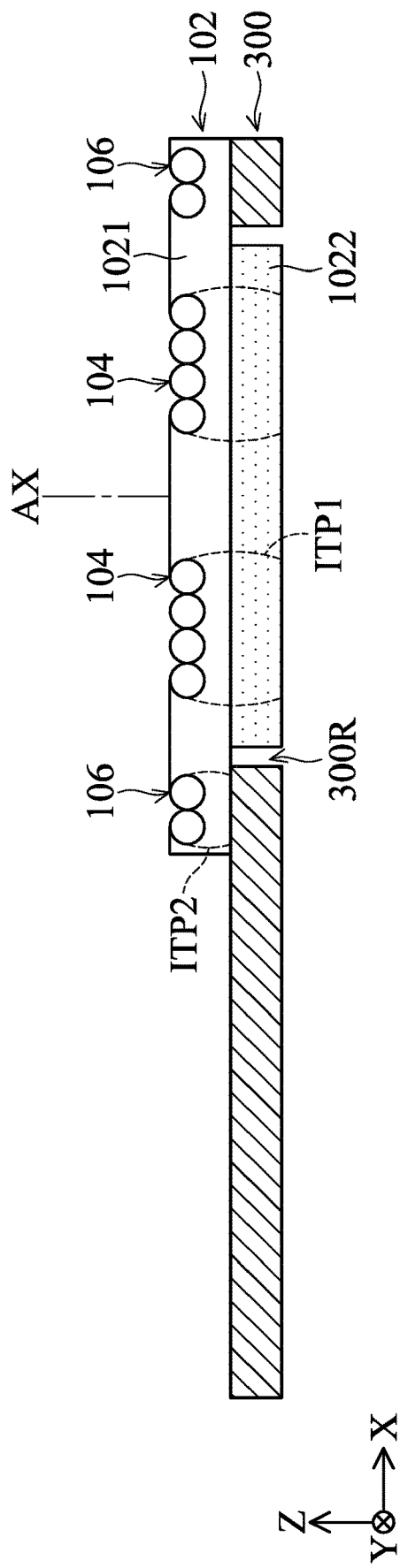
FIG. 9 is a schematic cross-sectional view of the wireless transmission module 100D and the external circuit 300 according to another embodiment of the present disclosure.

Please refer to FIG. 9, which is a schematic cross-sectional view of the wireless transmission module 100D and the external circuit 300 according to another embodiment of the present disclosure. The external circuit 300 is, for example, the aforementioned circuit board, and the external circuit 300 may include a receiving space 300R configured to receive at least a portion of the base assembly 102. Specifically, the receiving space 300R has an opening structure, and the second magnetically conductive portion 1022 is disposed in the receiving space 300R.

As shown in FIG. 9, when viewed in a direction that is perpendicular to the main axis AX, the external circuit 300 overlaps at least a portion of the base assembly 102. In addition, when viewed along the main axis AX (the X-axis), the external circuit 300 overlaps at least a portion of the base assembly 102.

When viewed in a direction that is perpendicular to the main axis AX, the external circuit 300 does not overlap the first coil 104. When viewed along the main axis AX, the external circuit 300 does not overlap the first coil 104. When viewed along main axis AX, the external circuit 300 overlaps at least a portion of the second coil 106. When viewed in a direction that is perpendicular to the main axis AX, the external circuit 300 overlaps at least a portion of the second magnetically conductive portion 1022.

In this embodiment, the base assembly 102 may further include a first induction portion ITP1 and a second induction portion ITP2. The first induction portion ITP1 corresponds to the first coil 104 and has a first characteristic function, and the second induction portion ITP2 corresponds to the second coil 106 and has a second characteristic function. The first and second characteristic functions are a permeability function or a loss rate function or the like for a specific electromagnetic wave.

It should be noted that, when corresponding to an electromagnetic wave with a specific frequency (the first frequency), the first and second characteristic functions are different.

As shown in FIG. 9, when viewed along the main axis AX, the first induction portion ITP1 overlaps at least a portion of the first coil 104, and when viewed along the main axis AX, the second induction portion ITP2 overlaps at least a portion of the second coil 106.

When viewed along the main axis AX, the second magnetically conductive portion 1022 overlaps at least one of the first coil 104 or the second coil 106. For example, the second magnetically conductive portion 1022 overlaps the first coil 104, and the second magnetically conductive portion 1022 does not overlap the second coil 106.

In addition, as shown in FIG. 9, in this embodiment, the first induction portion ITP1 covers a portion of the first magnetically conductive portion 1021, and the second induction portion ITP2 covers a portion of the first magnetically conductive portion 1021.

When viewed along the main axis AX, the second magnetically conductive portion 1022 overlaps at least a portion of the first magnetically conductive portion 1021, but it is not limited thereto. In other embodiments, the second magnetically conductive portion 1022 may not overlap the first magnetically conductive portion 1021. For example, the second magnetically conductive portion 1022 may surround the first magnetically conductive portion 1021, and the second magnetically conductive portion 1022 and the first magnetically conductive portion 1021 are on the same plane.

In this embodiment, when viewed in a direction that is perpendicular to the main axis AX, the second magnetically conductive portion 1022 does not overlap the first magnetically conductive portion 1021. Furthermore, in the main axis AX, the maximum size of the first induction portion ITP1 is different from the maximum size of the second induction portion ITP2. For example, the maximum size of the first induction portion ITP1 is larger than the maximum size of the second induction portion ITP2.

Figure 10:
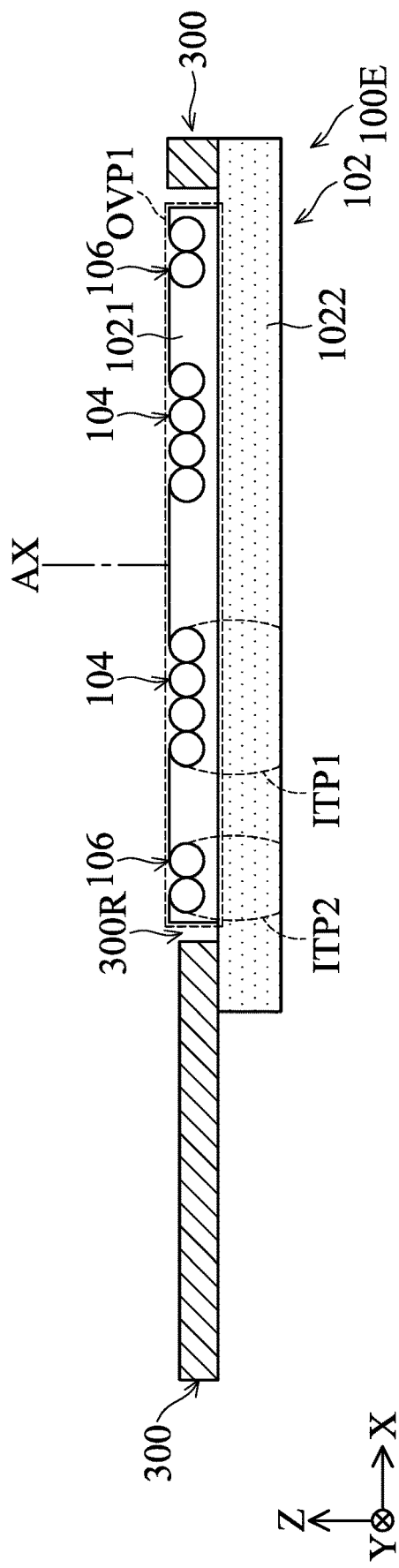
FIG. 10 is a schematic cross-sectional view of a wireless transmission module 100E and the external circuit 300 according to another embodiment of the present disclosure.

Next, please refer to FIG. 10, which is a schematic cross-sectional view of a wireless transmission module 100E and the external circuit 300 according to another embodiment of the present disclosure. Similar to the foregoing embodiments, the base assembly 102 of the wireless transmission module 100E includes a first magnetically conductive portion 1021 and a second magnetically conductive portion 1022, and the second magnetically conductive portion 1022 and the first magnetically conductive portion 1021 have different materials.

When viewed in a direction (X-axis) perpendicular to the main axis AX, the external circuit 300 overlaps at least a portion of the first magnetically conductive portion 1021. When viewed in a direction that is perpendicular to the main axis AX, the external circuit 300 overlaps at least a portion of the first coil 104. When viewed in a direction that is perpendicular to the main axis AX, the external circuit 300 overlaps at least a portion of the second coil 106.

In this embodiment, the base assembly 102 may define a first overlapping portion OVP1. When viewed in a direction that is perpendicular to the main axis AX, the external circuit 300 overlaps the first overlapping portion OVP1. When viewed along the main axis AX, the external circuit 300 does not overlap the first overlapping portion OVP1.

When viewed along the main axis AX, there is a gap between the first overlapping portion OVP1 and the external circuit 300. Based on this structural design, the efficiency of the operator to install the wireless transmission module 100E can be increased.

Similarly, the base assembly 102 includes a first induction portion ITP1 and a second induction portion ITP2. In this embodiment, the first induction portion ITP1 covers a portion of the first magnetically conductive portion 1021, and the second induction portion ITP2 covers a portion of the second magnetically conductive portion 1022.

Figure 11:
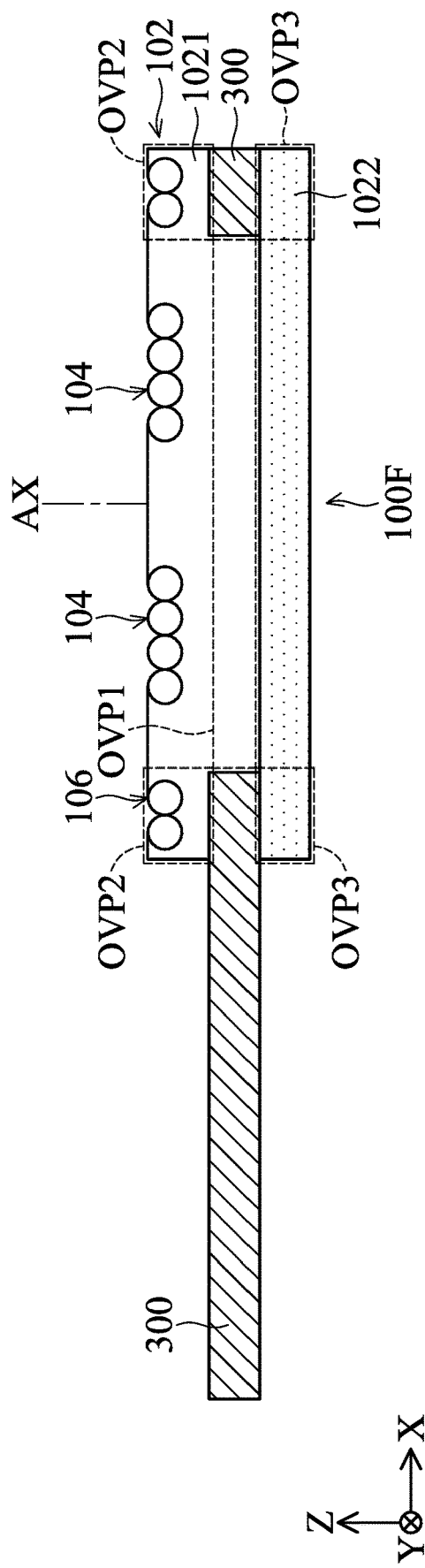
FIG. 11 is a schematic cross-sectional view of a wireless transmission module 100F and the external circuit 300 according to another embodiment of the present disclosure.

Next, please refer to FIG. 11, which is a schematic cross-sectional view of a wireless transmission module 100F and the external circuit 300 according to another embodiment of the present disclosure. Similar to the foregoing embodiments, the base assembly 102 of the wireless transmission module 100F includes a first magnetically conductive portion 1021 and a second magnetically conductive portion 1022, and the second magnetically conductive portion 1022 and the first magnetically conductive portion 1021 have different materials.

As shown in FIG. 11, the base assembly 102 defines a first overlapping portion OVP1, a second overlapping portion OVP2, and a third overlapping portion OVP3. When viewed in the direction (the X-axis) perpendicular to the main axis AX, the external circuit 300 overlaps the first overlapping portion OVP1. When viewed along the main axis AX, the external circuit 300 does not overlap the first overlapping portion OVP1.

When viewed along the main axis AX, the external circuit 300 overlaps the second overlapping portion OVP2. When viewed in a direction that is perpendicular to the main axis AX, the external circuit 300 does not overlap the second overlapping portion OVP2.

When viewed along the main axis AX, the external circuit 300 overlaps the third overlapping portion OVP3. When viewed in a direction that is perpendicular to the main axis AX, the external circuit 300 does not overlap the third overlapping portion OVP3. When viewed in a direction that is perpendicular to the main axis AX, the external circuit 300 is located between the second overlapping portion OVP2 and the third overlapping portion OVP3.

In this embodiment, the first overlapping portion OVP1, the second overlapping portion OVP2 and the third overlapping portion OVP3 are integrally formed as one piece. That is, the first overlapping portion OVP1, the second overlapping portion OVP2 and the third overlapping portion OVP3 are connected to each other without the need of the means of adhesion or welding.

In addition, it should be noted that the first overlapping portion OVP1 of this embodiment is in contact with the external circuit 300. Based on this structural design, it can be ensured that the wireless transmission module 100F can be tightly connected to the external circuit 300.

The present disclosure provides a wireless transmission module for transmitting energy or signals, including a base assembly and at least one coil. The coil is disposed in the base assembly, and the base assembly is composed of a plurality of magnetically conductive elements. After being heated and pressurized, these magnetically conductive elements are connected to each other, so that the base assembly forms a solid plate-shaped structure, and the coil can be firmly fixed in the base assembly.

Based on the design of the wireless transmission module of the present disclosure, the coils can be fixed in the base assembly without using glue or tape, so that the mechanical strength, usage efficiency, charging efficiency, heat dissipation efficiency can be improved, overall miniaturization and overall lightweight can be achieved, and the electromagnetic interference can be reduced, and so on.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless transmission module corresponding to an electronic module and configured to transmit a first signal, and the wireless transmission module comprising:
    a corresponding surface, facing the electronic module and being perpendicular to a main axis;
    a base assembly; and
    a first coil, disposed in the base assembly and including a first leading wire and an enhancement element, wherein
    the first leading wire is located at a first sidewall surface of the base assembly;
    the enhancement element is disposed on the first leading wire;
    the first sidewall surface is parallel to the main axis;
    the first leading wire passes through a first opening of the first sidewall surface;
    the first opening has a closed structure;
    the enhancement element is in direct contact with the first opening;
    the enhancement element has a non-metallic material;
    in the main axis, a shortest distance between the first coil and the corresponding surface is different from a shortest distance between the first leading wire and the corresponding surface;
    in the main axis, the shortest distance between the first coil and the corresponding surface is less than the shortest distance between the first leading wire and the corresponding surface;
    the base assembly further includes a first base surface facing the electronic module;
    the first base surface is not parallel to the first sidewall surface;
    when viewed along the main axis, the first coil overlaps at least a portion of the base assembly;
    when viewed in a direction that is perpendicular to the main axis, the first coil overlaps at least a portion of the base assembly.

2. The wireless transmission module as claimed in claim 1, wherein
    the base assembly includes a first magnetically conductive portion having a first magnetically conductive material;
    the base assembly includes a plurality of first magnetically conductive elements;
    the base assembly includes iron elements;
    the base assembly includes silicon elements;
    the base assembly includes chromium elements;
    a diameter of the first magnetically conductive element is less than 0.05 mm.

3. The wireless transmission module as claimed in claim 2, wherein
    the wireless transmission module further includes a first adhesive element configured to adhere to the first magnetically conductive elements;
    the first adhesive element is in direct contact with the first magnetically conductive elements;
    the first adhesive element is in direct contact with the first coil;
    the first coil is fixedly connected to the first magnetically conductive elements through the first adhesive element;

a melting point of the first adhesive element is higher than 70 degrees Celsius;
a melting point of the first adhesive element is lower than 400 degrees Celsius.

4. The wireless transmission module as claimed in claim 3, wherein
when viewed in a first direction, the base assembly covers at least a portion of the first coil;
the first direction is opposite to a direction in which the corresponding surface is facing;
the base assembly further includes:
a supporting portion, configured to support the first coil; and
a covering portion, covering a portion of the first coil;
when viewed in a direction that is perpendicular to the main axis, the first coil is located between the supporting portion and the electronic module;
when viewed along the main axis, the first coil overlaps at least a portion of the supporting portion;
when viewed in the first direction, at least a portion of the covering portion overlaps the first coil;
when viewed in a direction that is perpendicular to the main axis, at least a portion of the covering portion overlaps the first coil;
when viewed in a direction that is perpendicular to the main axis, in the main axis, a center of the first coil is located between the covering portion and the supporting portion.

5. The wireless transmission module as claimed in claim 1, wherein
the base assembly further includes a first structural strengthening portion configured to strengthen the mechanical structure of the base assembly;
the first structural strengthening portion is located between the first base surface and the first sidewall surface;
a surface of the first structural strengthening portion is not parallel to the first base surface and the first sidewall surface;
an included angle between the surface of the first structural strengthening portion and the first base surface is greater than 15 degrees;
an included angle between the surface of the first structural strengthening portion and the first sidewall surface is greater than 15 degrees;
the base assembly further includes a second base surface, and the second base surface and the first base surface face in opposite directions.

6. The wireless transmission module as claimed in claim 5, wherein
the base assembly further includes a second structural strengthening portion configured to strengthen the mechanical structure of the base assembly;
the second structural strengthening portion is located between the second base surface and the first sidewall surface;
a surface of the second structural strengthening portion is not parallel to the second base surface and the first sidewall surface;
a structure of the second structural strengthening portion is different from a structure of the first structural strengthening portion;
the surface of the second structural strengthening portion has a radius of curvature which is greater than 0.05 mm;
when viewed along the main axis, the first structural strengthening portion overlaps at least a portion of the second structural strengthening portion;
the wireless transmission module further includes a second coil, which is disposed in the base assembly;
the second coil is electrically independent from the first coil;
one of the first coil and the second coil is configured to transmit the first signal, and the other one is configured to transmit a second signal;
when viewed in a direction that is perpendicular to the main axis, the second coil overlaps at least a portion of the first coil.

7. A wireless transmission module corresponding to an electronic module and configured to transmit a first signal, and the wireless transmission module comprising:
a corresponding surface, facing the electronic module and being perpendicular to a main axis;
a base assembly; and
a first coil, disposed in the base assembly, wherein
when viewed along the main axis, the first coil overlaps at least a portion of the base assembly;
when viewed in a direction that is perpendicular to the main axis, the first coil overlaps at least a portion of the base assembly;
the base assembly includes a supporting portion configured to support the first coil and a covering portion covering a portion of the first coil;
the base assembly further includes a first base surface facing the electronic module;
the base assembly further includes a second base surface, and the second base surface and the first base surface face in opposite directions;
the wireless transmission module further includes a second coil, which is disposed in the base assembly;
the second coil is electrically independent from the first coil;
the wireless transmission module further includes a first protection element disposed on the first coil;
the first protection element has a plate-shaped structure and is in direct contact with the first base surface;
the first protection element is in direct contact with the first coil;
the first protection element is in direct contact with the second coil;
the first protection element includes a first adhesive portion configured to adhere to the first coil;
the first adhesive portion is adhered to the first base surface;
the first adhesive portion is adhered to the covering portion;
when viewed in a direction that is perpendicular to the main axis, the first coil is located between the supporting portion and the first protection element;
the first protection element further includes a first body, and the first adhesive portion is disposed on the first body;
the first protection element further includes a second adhesive portion configured to be attached to a first external element;
the first body is located between the first adhesive portion and the second adhesive portion;
the first external element is a casing of an electronic device.

8. The wireless transmission module as claimed in claim 7, wherein the base assembly further includes a first structural strengthening portion configured to strengthen the mechanical structure of the base assembly;

when viewed along the main axis, the first protection element overlaps at least a portion of the first structural strengthening portion;

the first adhesive portion is adhered to the first structural strengthening portion;

the wireless transmission module further includes a second protection element disposed on the second base surface;

the second protection element has a plate-shaped structure;

when viewed in a direction that is perpendicular to the main axis, the supporting portion is located between the first coil and the second protection element;

the second protection element includes a third adhesive portion configured to be attached to the second base surface;

the second protection element further includes a second body, and the third adhesive portion is disposed on the second body;

the second protection element further includes a fourth adhesive portion configured to be attached to a second external element;

the second body is located between the third adhesive portion and the fourth adhesive portion;

the second external element is a circuit assembly of the electronic device.

9. The wireless transmission module as claimed in claim 8, wherein the base assembly further includes a second structural strengthening portion configured to strengthen the mechanical structure of the base assembly;

when viewed along the main axis, the second protection element overlaps at least a portion of the second structural strengthening portion;

the third adhesive portion is adhered to the second structural strengthening portion;

the first protection element is in direct contact with the second protection element;

the first adhesive portion is adhered to the third adhesive portion.

10. The wireless transmission module as claimed in claim 9, wherein the base assembly further includes:

a first trench, located on the second base surface;

a second trench located on the second base surface; and a third trench, located on the second base surface;

the third adhesive portion corresponds to the first trench;

the first trench extends to the first coil;

when viewed in a direction that is perpendicular to the main axis, the first trench does not overlap the first coil;

when viewed along the main axis, the first trench overlaps at least a portion of the first coil;

when viewed in a direction that is perpendicular to the main axis, the second trench overlaps at least a portion of the first coil;

the second trench is located on the first base surface;

the first adhesive portion corresponds to the second trench;

the third adhesive portion corresponds to the second trench;

in the main axis, a maximum size of the first trench is different from a maximum size of the second trench;

in the main axis, the maximum size of the first trench is smaller than the maximum size of the second trench;

when viewed in a direction that is perpendicular to the main axis, the third trench does not overlap the second coil;

when viewed along the main axis, the third trench overlaps at least a portion of the second coil;

the third adhesive portion corresponds to the third trench;

in the main axis, a maximum size of the third trench is smaller than the maximum size of the second trench.

11. A wireless transmission module corresponding to an electronic module and configured to transmit a first signal, and the wireless transmission module comprising:

a corresponding surface, facing the electronic module and being perpendicular to a main axis;

a base assembly; and a first coil, disposed in the base assembly, wherein when viewed along the main axis, the first coil overlaps at least a portion of the base assembly;

when viewed in a direction that is perpendicular to the main axis, the first coil overlaps at least a portion of the base assembly;

the wireless transmission module further includes a second coil disposed in the base assembly;

the wireless transmission module further includes a first conductive element;

the first coil is electrically connected to an external circuit through the first conductive element;

the first conductive element has a plate-shaped structure;

the first conductive element has a metal material;

at least a portion of the first conductive element is buried in and not exposed from the base assembly;

a surface of a first external electrical connection portion of the first conductive element is perpendicular or parallel to the main axis;

the first external electrical connection portion is configured to be electrically connected to the external circuit;

a portion of the first external electrical connection portion is exposed from the base assembly;

a surface of a first internal electrical connection portion of the first conductive element is perpendicular or parallel to the main axis;

the first internal electrical connection portion is configured to be electrically connected to the first coil;

the first internal electrical connection portion is exposed from the base assembly;

the wireless transmission module further includes a first reinforcing element that is in direct contact with the first internal electrical connection portion;

a first conducting wire of the first coil has a first cross-section, the first conducting element has a second cross-section, and the first cross-section and the second cross-section have different structures;

the first cross-section has a circular arc structure;

the second cross-section has a polygonal structure.

12. The wireless transmission module as claimed in claim 11, wherein the wireless transmission module further includes:

an electronic component, disposed on the base assembly;

a second conductive element, wherein the electronic component is electrically connected to the external circuit through the second conductive element; and a third conductive element, wherein the second coil is electrically connected to the external circuit through the third conductive element;

the second conductive element has a plate-shaped structure;

the second conductive element has a metal material;

at least a portion of the second conductive element is buried in and not exposed from the base assembly;
a surface of a second external electrical connection portion of the second conductive element is perpendicular or parallel to the main axis;
the second external electrical connection portion is configured to be electrically connected to the external circuit;
the second external electrical connection portion is exposed from the base assembly;
the surface of the first external electrical connection portion is parallel to the surface of the second external electrical connection portion;
the surface of the first external electrical connection portion and the surface of the second external electrical connection portion are coplanar;
a surface of the first external electrical connection portion facing the first coil and the surface of the first internal electrical connection portion facing the first coil are located on different planes;
a surface of a second internal electrical connection portion of the second conductive element is perpendicular or parallel to the main axis;
the second internal electrical connection portion is configured to be electrically connected to the electronic component;
the second internal electrical connection portion is exposed from the base assembly;
the second conductive element has a second cross-section, and the second cross-section has a polygonal structure;
the surface of the first internal electrical connection portion is parallel to the surface of the second internal electrical connection portion;
the surface of the first internal electrical connection portion and the surface of the second internal electrical connection portion are coplanar.

13. The wireless transmission module as claimed in claim 12, wherein
the third conductive element has a plate-shaped structure;
the third conductive element has a metal material;
at least a portion of the third conductive element is buried in and not exposed from the base assembly;
a surface of a third external electrical connection portion of the third conductive element is perpendicular or parallel to the main axis;
the third external electrical connection portion is configured to be electrically connected to the external circuit;
the third external electrical connection portion is exposed from the base assembly;
a surface of a third internal electrical connection portion of the third conductive element is perpendicular or parallel to the main axis;
the third internal electrical connection portion is configured to be electrically connected to the second coil;
the third internal electrical connection portion is exposed from the base assembly;
the surface of the third internal electrical connection portion and the surface of the first internal electrical connection portion are coplanar.

14. The wireless transmission module as claimed in claim 13, wherein
the wireless transmission module further includes:
a second reinforcing element, directly contacting the second internal electrical connection portion;
a third reinforcing element, directly contacting the third internal electrical connection portion; and
a fourth reinforcing element, directly contacting the first external electrical connection portion;
the second reinforcing element has a non-metallic material;
the third reinforcing element has a non-metallic material;
the first reinforcing element and the fourth reinforcing element are integrally formed;
the electronic component is disposed in a receiving portion of the base assembly;
the base assembly includes a first base surface facing the electronic module;
the receiving portion has a concave structure and is located on the first base surface;
the wireless transmission module further includes a first protection element disposed on the first coil;
the first protection element includes an opening corresponding to the receiving portion;
when viewed in a first direction, at least a portion of the electronic component is exposed from the opening;
at least a portion of the first coil is exposed from the receiving portion;
in the main axis, a maximum size of a first induction body of the first coil is different from a maximum size of the base assembly;
in the main axis, the maximum size of the first induction body is less than the maximum size of the base assembly;
in the main axis, the maximum size of the first induction body is less than one third of the maximum size of the base assembly.

15. A wireless transmission module corresponding to an electronic module and configured to transmit a first signal, and the wireless transmission module comprising:
a corresponding surface, facing the electronic module and being perpendicular to a main axis;
a base assembly; and
a first coil, disposed in the base assembly, wherein
when viewed along the main axis, the first coil overlaps at least a portion of the base assembly;
when viewed in a direction that is perpendicular to the main axis, the first coil overlaps at least a portion of the base assembly;
the base assembly includes a first magnetically conductive portion having a first magnetically conductive material;
the wireless transmission module further includes a second coil disposed in the base assembly;
the base assembly further includes:
a first induction portion, corresponding to the first coil and having a first characteristic function; and
a second induction portion, corresponding to the second coil and having a second characteristic function;
when viewed along the main axis, the first induction portion overlaps at least a portion of the first coil;
when viewed along the main axis, the second induction portion overlaps at least a portion of the second coil;
when corresponding to an electromagnetic wave with a first frequency, the first and second characteristic functions are different;
the base assembly further includes a second magnetically conductive portion, and the second magnetically conductive portion and the first magnetically conductive portion have different materials;
when viewed along the main axis, the second magnetically conductive portion overlaps at least one of the first coil and the second coil;
the first induction portion covers a portion of the first magnetically conductive portion;

the second induction portion covers a portion of the second magnetically conductive portion.

16. The wireless transmission module as claimed in claim 15, wherein when viewed along the main axis, the second magnetically conductive portion overlaps at least a portion of the first magnetically conductive portion;

when viewed in a direction that is perpendicular to the main axis, the second magnetically conductive portion does not overlap the first magnetically conductive portion;

in the main axis, a maximum size of the first induction portion is different from a maximum size of the second induction portion;

an external circuit includes a receiving space configured to receive at least a portion of the base assembly;

the receiving space has an opening structure;

when viewed in a direction that is perpendicular to the main axis, the external circuit overlaps at least a portion of the base assembly;

when viewed along the main axis, the external circuit overlaps at least a portion of the base assembly.

17. The wireless transmission module as claimed in claim 16, wherein when viewed in a direction that is perpendicular to the main axis, the external circuit overlaps at least a portion of the first magnetically conductive portion;

when viewed in a direction that is perpendicular to the main axis, the external circuit overlaps at least a portion of the first coil;

when viewed in a direction that is perpendicular to the main axis, the external circuit overlaps at least a portion of the second coil;

the base assembly defines a first overlapping portion, and when viewed in a direction that is perpendicular to the main axis, the external circuit overlaps the first overlapping portion;

when viewed along the main axis, the external circuit does not overlap the first overlapping portion;

when viewed along the main axis, there is a gap between the first overlapping portion and the external circuit.

18. The wireless transmission module as claimed in claim 16, wherein when viewed in a direction that is perpendicular to the main axis, the external circuit does not overlap the first coil;

when viewed along the main axis, the external circuit does not overlap with the first coil;

when viewed along the main axis, the external circuit overlaps at least a portion of the second coil;

when viewed in a direction that is perpendicular to the main axis, the external circuit overlaps at least a portion of the second magnetically conductive portion.

19. The wireless transmission module as claimed in claim 16, wherein the base assembly defines a first overlapping portion, a second overlapping portion and a third overlapping portion;

when viewed in a direction that is perpendicular to the main axis, the external circuit overlaps the first overlapping portion;

when viewed along the main axis, the external circuit does not overlap the first overlapping portion;

when viewed along the main axis, the external circuit overlaps the second overlapping portion;

when viewed in a direction that is perpendicular to the main axis, the external circuit does not overlap the second overlapping portion;

when viewed along the main axis, the external circuit overlaps the third overlapping portion;

when viewed in a direction that is perpendicular to the main axis, the external circuit does not overlap the third overlapping portion;

when viewed in a direction that is perpendicular to the main axis, the external circuit is located between the second overlapping portion and the third overlapping portion;

the first overlapping portion, the second overlapping portion and the third overlapping portion are integrally formed as one piece;

the first overlapping portion is in contact with the external circuit.

* * * * *